United States Patent [19]

McCullough, Jr. et al.

[11] Patent Number: 4,923,747
[45] Date of Patent: May 8, 1990

[54] CERAMIC THERMAL BARRIERS

[75] Inventors: Francis P. McCullough, Jr.; Steven L. Brewster, both of Lake Jackson; R. Vernon Snelgrove, Damon, all of Tex.

[73] Assignee: The Dow Chemical Company, Midland, Mich.

[21] Appl. No.: 233,685

[22] Filed: Aug. 18, 1988

[51] Int. Cl.[5] .................. B32B 5/18; B32B 18/00; B32B 33/00; C04B 35/78
[52] U.S. Cl. .................. 428/312.6; 428/312.8; 428/317.9; 428/698; 428/911; 428/921; 501/95
[58] Field of Search ............... 501/95; 428/408, 312.6, 428/312.8, 317.9

[56] References Cited

U.S. PATENT DOCUMENTS

| | | | |
|---|---|---|---|
| 4,256,378 | 3/1981 | Prewo | 501/95 |
| 4,341,965 | 7/1982 | Oku et al. | 501/95 |
| 4,460,639 | 7/1984 | Chi et al. | 428/408 |
| 4,568,595 | 2/1986 | Morris | 428/116 |
| 4,735,850 | 4/1988 | Eitman | 501/95 |
| 4,746,287 | 5/1988 | Lannutti | 501/95 |
| 4,781,993 | 11/1988 | Bhatt | 428/408 |

OTHER PUBLICATIONS

PCT WO 86/06110, 10/23/86, McCallough et al.

*Primary Examiner*—James C. Cannon

[57] ABSTRACT

A lightweight ceramic structure comprising a set porous ceramic composition and a batting, felt or web of carbonaceous fibers within said ceramic composition in a reinforcing amount.

17 Claims, 1 Drawing Sheet

CERAMIC THERMAL BARRIERS

FIELD OF THE INVENTION

The present invention relates to lightweight ceramic thermal barriers. More particularly, the invention is concerned with lightweight porous ceramic structures reinforced by carbonaceous fibers for use as ceramic thermal barriers such as refractory material for furnace linings and as lightweight armor. The structure may be provided with a metallic layer.

BACKGROUND OF THE INVENTION

The prior art has used various ceramic materials, particularly ceramic foams as thermal insulation of refractory material having fire blocking properties. Ceramic tiles which have been bonded to metal structures for use in turbines and furnaces are also known. However, these ceramic materials by themselves are heavy. The addition of fillers reduces the density of the ceramic structures but the mechanical properties are also affected.

It is often desirous for refractory materials to be inert to elevated temperatures, corrosive environments and rapid changes in temperature while maintaining its strength and structural integrity. It is further desirous to maximize these properties while minimizing heat capacity and thermal conductivity. There are many types of refractories available today ranging from the very dense fused cast types to the highly insulating fiber types. The fiber refractories have very low thermal conductivity and heat capacity which is desirous. The shortcomings of fiber refractories are low load bearing capability and low corrosion resistance along with shrinkage at the upper use temperature limits. The dense and insulating type refractories generally have good strength at temperature and are capable of being formed from corrosion and erosion resistant materials. The shortcomings of these materials, be it the preformed or monolith type, is that they have relatively high heat capacity due to their inherent mass. Due to the high heat capacity, the energy requirements to bring these materials to temperature is much greater than the fiber insulation.

In ceramic-metal combinations, cracks may occur as a result of the different coefficients of expansion between the metal and the ceramic. Prior attempts to solve such problems was to provide expansion gaps or to utilize a discontinuous ceramic layer.

It is known to apply coatings of ceramics and metals by vapor deposition. The general subject of vapor deposition is described in an article by R. F. Bunshah "Journal of Vacuum Science of Technology", Vol. 11, No. 4 July/August 1974. The application of ceramics by vapor deposition is employed chiefly in the semiconductor and optics industries where extremely thin coatings are used.

In vapor deposition, the article to be coated is held over a molten pool of material of appropriate composition which evaporates, and the vapor condenses on and coats the article. This process is used in a variety of applications including the application of metallic coatings to gas turbine engine parts. The application to gas turbine engine arts is described in the "Journal of Vacuum Science of Technology", Vol. 11, No. 4, July/August 1974, pgs. 641 through 646 in an article by Boone, et al.

U.S. Pat. No. 4,568,595 of Moris, which is herewith incorporated by reference, discloses reticulated ceramics having a pore distribution between 5 and 125 p.p.i.

U.S. patent application Ser. No. 108,255, filed Oct. 13, 1987, of McCullough, et al, which is herein incorporated by reference, discloses non-linear carbonaceous fibers which can be utilized in the structures of the invention.

It is an object of this invention to provide an improved refractory material which will not compromise the desired load bearing properties and corrosion-erosion resistance for low heat capacity. This ceramic refractory structure possesses good load bearing strength, corrosion-erosion resistance yet has a low thermal conductivity, low heat capacity and excellent thermal shock resistance.

SUMMARY OF THE INVENTION

Briefly, according to this invention, there is provided a lightweight ceramic structure comprising a set porous ceramic composition having batting, felt or web comprising carbonaceous fibers incorporated therein. Preferably, the carbonaceous fibers are non-linear and have a reversible deflection ratio of greater than 1.2:1 and an aspect ratio greater than 10:1. The non-linear fibers may be coil-like or sinusoidal or have a complex configuration of the two. The fibers are advantageously utilized in an amount of about 1–20% by weight of composition, preferably about 2–5%.

DETAILED DESCRIPTION OF THE PREFERRED EMBODIMENTS

In accordance with the present invention, a lightweight porous ceramic structure is provided wherein ceramic material is formed on a fibrous carbonaceous substrate, i.e., a plurality of fibers or filaments such as in the form of a mat, batting, or fabric.

Figure 1:
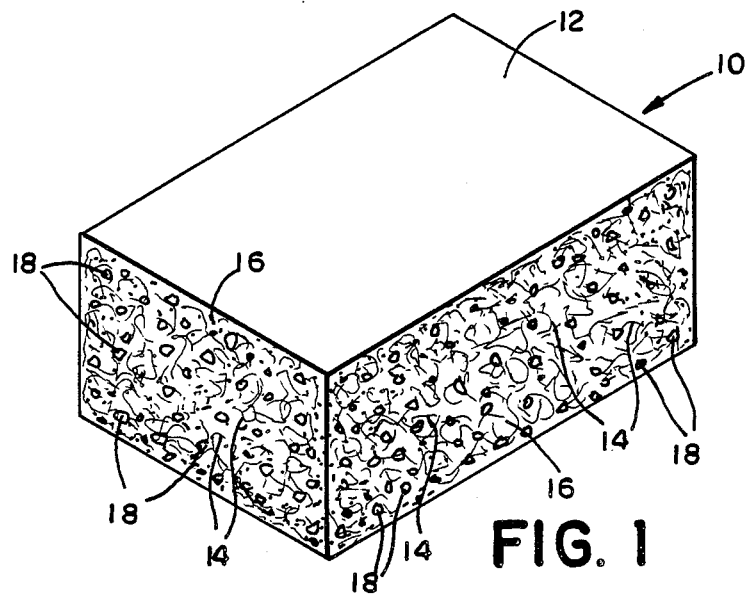
FIG. 1 is a perspective view of a coated ceramic block of the invention with a batting of carbonaceous fibers therein; and, FIG. 2 is a cross-sectional view of a block of the invention with a plurality of webs.

As seen in FIG. 1, a light weight ceramic block 10 comprises a batting of carbonaceous fibers 14 within a matrix of ceramic material. The ceramic material is provided with a multiplicity of pores 18 during forming or setting by conventional means. The fibers 14 are preferably non-linear so as to increase the porosity of the ceramic.

If desired, the ceramic block 10 may be coated with a film of metallic material 12 by vapor deposition or may be sintered.

Figure 2:
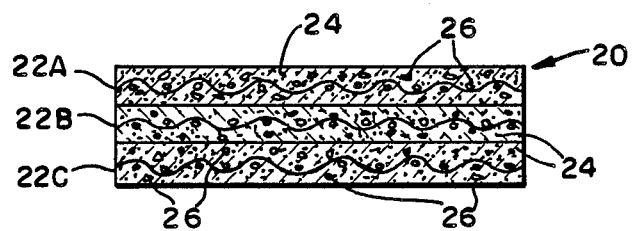

As shown in FIG. 2, a ceramic structure 20 of the invention may comprise a plurality of woven webs 22A, 22B, 22C of carbonaceous fibers within a porous ceramic matrix 24 containing a multiplicity of pores 26.

The pore sizes may comprise from 5 to 125 pores per inch (p.p.i.). The pore diameters will vary depending upon the particle size and the materials utilized to make the ceramic matrix.

The ceramic materials which can be utilized in the present invention comprises the oxides or mixtures of oxides, of one or more of the following elements: magnesium, calcium, strontium, barium, aluminum, scandium, yttrium, the lanthanides, the actinides, gallium, indium, thallium, silicon, titanium, zirconium, hafnium, thorium, germanium, tin, lead, vanadium, niobium, tantalum, chromium, molybdenum, tungsten, and uranium. Compounds such as the carbides, borides and silicades of the transition metals may also be used. Other suitable ceramic materials which may be used are zircon-mullite, mullite, alpha alumina, sillimanite, magnesium silicates, zircon, petalite, spodumene, cordierite and alumino-silicates. Suitable proprietary products are "MATTECEL" (Trade Name) supplied by Matthey Bishop, Inc., "TORVEX" (Registered Trademark) sold by E.I. du Pont de Nemours & Co., "Wl" (Trade Name) sold by Corning Glass and "THERMACOMB" (Registered Trademark) sold by the American Lava Corporation. Another useful product is described in British Patent No. 882,484.

Other suitable active refractory metal oxides include for example, active or calcined beryllia, baria, alumina, titania, hafnia, thoria, zirconia, magnesia or silica, and combination of metal oxides such as boria-alumina or silica-alumina. Preferably the active refractory oxide is composed predominantly or oxides of one or more metals of Groups II, III and IV of the Periodic Table.

Among the preferred compounds may be mentioned YC, $FiB_2$, $HfB_2$, $VB_2$, VC, VN, $NbB_2$, NbN, $TaB_2$, $CrB_2$, $MoB_2$ and $W_2B$.

Advantageously, the ceramics utilized in the present invention are selected from oxides such as $TiO_2$; nitrides such as BN; carbides such as BC and TiC; borides such as $TiB_2$ and TiB; metals for example Ni, Au, and Ti; and the like.

The fibers utilized for the fibrous substrate of the present invention, herein referred to as "carbonaceous fibers" have a carbon content of at least 65% and their method of preparation are, preferably, those described in U.S. patent application Ser. No. 856,305, entitled "Carbonaceous Fibers with Spring-Like Reversible Reflection and Method of Manufacture," filed 4-28-86, by McCullough et al.; incorporated herein by reference and as described in U.S. patent application Ser. No. 918,738, entitled "Sound and Thermal Insulation," filed, 10-14-86, by McCullough et al.; incorporated herein by reference.

The carbonaceous fibers comprise non-linear, non-flammable resilient elongatable carbonaceous fibers having a reversible deflection ratio of greater than about 1.2:1 and an aspect ratio (1/d) of greater than 10:1. The carbonaceous fibers may possess a sinusoidal or coil-like configuration or a more complicated structural combination of the two. Preferably, the carbonaceous fibers used are sinusoidal in configuration.

The carbonaceous precursor starting materials may have imparted to them an electrically conductive property on the order of that of metallic conductors by heating the fiber fluff or the batting like shaped material to a temperature above about 1000 degrees C. in a non-oxidizing atmosphere. The electroconductive property may be obtained from selected starting materials such as pitch (petroleum or coal tar), polyacetylene, acrylonitrile based materials, e.g., a polyacrylonitrile copolymer (PANOX or GRAFIL-01), polyphenylene, polyvinylidene chloride resin (SARAN, trademark of The Dow Chemical Company) and the like.

The carbonaceous fiber material comprising the fibrous structures of this invention may be classified into three groups depending upon the particular use and the environment that the structures in which they are incorporated are placed.

In a first group, the non-flammable carbonaceous fibers are non-electrically conductive and possess no anti-static characteristics.

The term non-electrically conductive as utilized in the present invention relates to a resistance of greater than $10^7$ ohms per inch on a 6K tow formed from precursor fibers having a diameter of about 7 to 20 microns.

When the precursor fiber is an acrylic fiber it has been found that a nitrogen content of 18.8% or more results in a non-conductive fiber.

In a second group, the non-flammable carbonaceous fibers are classified as being partially electrically conductive (i.e., having a low conductivity) and have a carbon content of less than 85%. Low conductivity means that a 6K tow of fibers has a resistance of about $10^7$ to $10^4$ ohms per inch. Preferably, the carbonaceous fibers are derived from stabilized acrylic fibers and possesses a percentage nitrogen content of from about 16 to 22% for the case of a copolymer acrylic fiber, more preferably from about 16 to 18.8%.

In a third group are the fibers having a carbon content of at least 85%. These fibers are characterized as being highly conductive. That is, the resistance is less than $10^4$ ohms per inch and are useful in applications where electrical grounding or shielding are also desired.

The carbonaceous fibrous substrate of this invention may be used in substantially an desired fabricated form which will depend on the purpose for which the structure is to be used.

In one embodiment of the invention, the fiber substrate may be carbonaceous fibers used in the form of a fiber assembly such as a yarn or tow composed of many filaments.

In another embodiment the fiber substrate may be the carbonaceous fibers fabricated formed into a knitted cloth, for example, plain jersey knit, interlock, ribbed, cross float jersey knit or weft knit, and the like, or woven into a fabric. The woven fabric may combine the carbonaceous fibers of the present invention, for example as warp.

The fiber assembly may also be in the form of a non-woven material or fabric such as a mat, fluff or batting of fibers such as described above. In another embodiment the composite may include the wool-like fluffy material produced from the thermally set knitted fabric which contains the non-linear fiber. The substrate in the form of a batting or wool-like fluff may be prepared by conventional needle-punching means.

The ceramic structure of the present invention may be prepared utilizing any conventional method. For example, the ceramic composition may be mixed under high speed stirring, and added as a foam onto a fibrous structure or blanket which is moved on a conveyor. A vacuum means draws the foam into the fibrous structure and the ceramic is then cured by heat. The non-linear structure of the fibers helps to promote porosity.

Another method of forming the ceramic structures of the invention is to place the fibrous material and a porous ceramic composition in a mold and cure the composition with heat or steam.

The ceramic foam utilized may comprise about 20-70% ceramic, about 1-10% silica, about 1-10% inorganic binder, 0-1% surfactant and water.

The materials are mixed under high shear until creamy, then viscosity adjustments may be made. The surfactant aids in forming a dispersion of the ceramic within the fluids. A viscosity range between 250 and 1500 centipoise produces a suitable porous ceramic structure.

The present invention is further illustrated by the following examples, but is not to be limited thereby. The amounts shown throughout the specification are all in percent by weight of composition.

EXAMPLE 1

A. A piece of cloth (plain jersey) from tows (6K) of PANOX OPF (oxidized PAN fiber) was heat treated to at a maximum temperature of 900 degrees C. to form the carbonaceous fibrous substrate of this invention. A single tow of carbonaceous fiber was deknitted from the fibrous substrate fabric to form a batting.

B. An example of a formulation for a 2000 gram batch of ceramic composition comprising 98% alumina is prepared as follows:

| | |
|---|---|
| Alumina | 1960 g |
| Silica | 100 g |
| Binder | 200 g |
| Surfactant | 5 ml |
| Water | 1000 ml |

The materials are mixed under high sheer until creamy and the viscosity is adjusted to about 500 centipoise.

The batting from Part A was placed in a shallow pan 2"×4"×4" and the ceramic composition of Part B was poured into the pan to completely cover the batting. The pan was then placed into a fired kiln for 20 minutes and cooled to produce a ceramic block.

| Results | |
|---|---|
| Maximum use temperature | 1800° C. |
| Thermal shock resistance | Excellent |
| Compressive strength (psi) | 160 |

A block prepared without the carbonaceous fibers was as follows:

| | |
|---|---|
| Maximum use temperature | 1700° C. |
| Thermal shock | Good |
| Compressive strength | 165 |

The carbonaceous fibers improved the use temperature and shock resistance without any substantial change in compressive strength.

If desired, the block may be metal coated by vapor deposition or its surface sintered with an open flame.

EXAMPLE 2

A piece of carbonaceous fiber knitted fabric (prepared at 700 degrees C.) was de-knitted, i.e., the individual tows were removed from the knit structure. The tows were then opened with a Shirley opener and the open tows were mixed with a polyester binder in a Rando Webber to produce a non-woven fabric or batting material containing 25% polyester binder and 75% carbonaceous fiber. The non-woven was further treated with heat to melt the polyester binder to impart greater integrity to the batting (known as bonding). The bonded non-woven mat was then needle punched to provide greater entangling of the batting's fibers thus providing greater integrity and strength to the non-woven fabric.

The bonded, needle-punched batting was cut into three specimens of approximately 2"×4"×4" and these specimens were then heated, under a nitrogen atmosphere, to a temperature of 1000 degrees C. The specimens were placed into separate 2"×4"×4" pans containing the following compositions:

| A | B | C |
|---|---|---|
| Mullite 1960 g | Lithium Aluminum silicate 1960 g | zirconia 1960 g |
| Silica 100 g | silica 100 g | silica 100 g |
| Binder 200 g | binder 200 g | binder 200 g |
| Surfactant 5 ml | surfactant 5 ml | surfactant 5 ml |
| Water 1000 ml | water 1000 ml | water 1000 ml |

Comparison pans were simultaneously prepared without any fibers.

The pans were all placed in a pottery kiln for 1 hour and cooled.

| Results | | |
|---|---|---|
| | Mullite with fibers | Mullite without fibers |
| maximum use temperature | 1900° C. | 1650° C. |
| compressive strength psi | 410 | 400 |
| thermal shock | excellent | good |
| | Lithium aluminum silicate with fibers | Lithium aluminum silicate without fibers |
| maximum use temperature | 1400° C. | 1250° C. |
| compressive strength psi | 250 | 100 |
| thermal shock | excellent | good |
| | Zirconia with fibers | Zirconia without fibers |
| maximum use temperature | 2100° C. | 1800° C. |
| compressive strength psi | 325 | 285 |
| thermal shock | excellent | good |

What is claimed is:

1. A lightweight ceramic structure comprising a set porous ceramic composition and a batting, felt or web of carbonaceous fibers within said ceramic composition in a reinforcing amount.

2. The structure of claim 1, wherein said fibers are non-linear fibers having a reversible deflection ratio of greater than 1.2:1 an aspect ratio greater than 10:1.

3. The structure of claim 2, wherein said fibers having a sinusoidal configuration.

4. The structure of claim 2, wherein said fibers having a coil-like configuration.

5. The structure of claim 1 wherein said fibers are electrically conductive fibers.

6. The structure of claim 1 wherein said ceramic comprises a titanium compound selected from the group consisting of titanium nitride, titanium carbide, titanium boride and titanium silicide.

7. The structure of claim 1 wherein said ceramic is a metal oxide.

8. The structure of claim 1 wherein said structure contains a metal layer.

9. The structure of claim 1 wherein said fibers have a carbon content of less than 85%.

10. The structure of claim 1, wherein said fibers are present in an amount of about 1-20% by weight of composition.

11. The structure of claim 1 wherein said fibers have a carbon content of at least 85%.

12. The structure of claim 1 wherein said fibers are derived from stabilized acrylic fibers and said carbonaceous fibers have a percent nitrogen content of from about 16 to 18.8%.

13. In a ceramic foam structure, the improvement which comprises said foam structure having incorporated therein a batting or web of non-linear carbonaceous fibers, said fibers having a reversible deflection ratio of greater than 1.2:1 and an aspect ratio greater than 10:1 in a structure reinforcing amount.

14. The structure of claim 13 wherein said fibers are electrically conducive.

15. The structure of claim 13 wherein said fibers are derived from stabilized acrylic fibers.

16. The structure of claim 13 wherein said fibers comprises coil-like carbonaceous fibers.

17. The structure of claim 18 wherein said fibers comprises sinusoidal carbonaceous fibers.

* * * * *